Patented Oct. 27, 1953

2,657,153

UNITED STATES PATENT OFFICE 2,657,153

COATING CERAMIC AND MASONRY PRODUCTS

Alexander H. Russell, Baltimore, Md., assignor to The Burns & Russell Company of Baltimore City, Baltimore, Md., a corporation of Maryland No Drawing. Application June 4, 1948, Serial No. 31,222

4 Claims. (Cl. 117—54)

This application is a continuation-in-part of my application Serial No. 685,915, filed July 24, 1946, and now abandoned.

The invention relates to the coating of ceramic or baked clay products, such as brick, pottery, various types of wall and veneer tile, and masonry building units, such as molded blocks made of cinder, concrete and the like. More particularly, my invention deals with the application of a resinous coating compound to one or more faces of such products to be exposed to improve their appearance, resistance to moisture penetration, and otherwise produce a decorative serviceable surface.

Such products have been coated heretofore with a ceramic glaze finish to produce a smooth, glossy white or colored surface, but such a coating operation involves one or more special firing operations at a relatively high temperature and is expensive. Other types of coatings, such as ordinary paints and enamels and, in some cases, special paints, such as asphalt base paints, have been applied to building materials such as brick and concrete, but liquid coatings of this character are difficult to apply to produce a smooth finish, and either do not adhere properly or have to be renewed at frequent intervals.

One object of this invention is to provide a simple, inexpensive but effective, coating for ceramic and masonry products which permits a wide range of decorative effects, and produces a surface that is very durable and may be made similar in appearance to a ceramic glazed coating.

Another object of my invention is to provide a coating for such products by the application of a resinous coating material that is hardened or cured in place after it is applied.

A further object of my invention is the application of such a coating to one or more faces of individual building units before the individual units are used to make a structure, the faces coated being only those that are to be exposed in the finished structure.

A still further object of my invention is the provision of a process of applying such a resinous coating to ceramic and other products while the product to be coated is at an elevated temperature.

A further object is the application of such a resinous coating to baked clay products while they are still hot from being fired, thus utilizing the residual heat in the products to effect at least a partial cure of the resinous coating material.

Other objects and advantages of the invention will be explained and will be apparent from the following description thereof.

I have found that smooth, decorative coatings can be produced in any desired color and with any degree of gloss having a hard dense surface, good gloss retention, color stability and other desirable lasting qualities by the proper application of a resinous coating material to the surface of a baked clay product or other molded building units, such as cinder blocks and concrete blocks. The roughness and porosity of the surfaces to be coated determine to a large extent the composition and manner of application that are best for applying the resinous coating material. An essential ingredient of the coating composition, however, is a thermo-setting resin which may, for example, be one of the melamine-aldehyde, urea-formaldehyde or phenolic resins that is sufficiently condensed or polymerized to be capable of hardening or curing under the influence of heat in a relatively short time. Two or more such thermo-setting resins that are compatible such as a melamine-aldehyde resin and a heat convertible alkyd resin may be employed. Other ingredients that may be included in the coating composition, if needed or desired, comprise pigments, fillers, plasticizing agents and the like.

The resinous coating composition may be applied in either dry or liquid form, depending upon the procedure used for applying and curing the resin. I have found, however, that for practical reasons it is most desirable to apply the resinous coating composition in the form of a liquid.

In preparing such a liquid coating material, the dry ingredients may be milled separately or together with at least a portion of the solvent used until the solid particles are thoroughly wetted and a pasty mix is formed. The paste thus obtained can then be mixed easily with the remainder of the solvent. The coating composition may contain a small amount of a suitable curing agent for the resin, which, as understood by those skilled in the art, should be selected to serve as a curing agent for the particular resin used, taking into account the temperature at which the resin is to be hardened or cured. The exact proportions of resin, pigment, filler, plasticizer and the like are not particularly critical, although it is essential to employ a sufficient quantity of thermo-setting resin to serve as a bonding agent for the entire composition and also to provide a relatively smooth, stable outer surface after the coating is hardened. In general, the amount of pigment will vary depending upon the color desired, but usually will amount to about 15–30 parts of pigment for each 100 parts by weight of total solids in the composition. While these proportions are usually satisfactory, it should be understood that my invention is not limited to the use of this particular proportion.

When the coating composition is applied in liquid form, it is important to adjust the viscosity and solids content of the coating composition in accordance with the porosity and roughness of the surface to be coated. For example, with more porous products, such as cinder block, it is most desirable to use a coating composition of higher viscosity and usually higher solids content, than is required for coating a baked clay surface that is relatively dense and smooth. Some filler may be worked into the composition for the more porous surfaces so that the coating material will not penetrate too quickly and deeply into the surface to be coated. On the other hand, the coating composition should not be so viscous that it will not flow readily and form a smooth surface as it is applied, or so that it cannot be readily applied by usual methods such as spraying, brushing, dipping or the like.

I have found that the most satisfactory way of applying such coatings is to apply the coating material in liquid form to a hot or heated surface of the product to be coated. If the brick or other articles being coated are cold and a liquid resinous composition is applied in this state, it readily soaks into the surface being treated and does not even do an effective priming job of sealing the pores in preparation for the formation of a smooth, hard surface. However, by applying a very light coating of a composition containing a thermo-setting resin to a hot surface of a baked clay or other product to be coated, the resin in the composition thus applied sets up almost immediately and produces a good base for one or more additional coats. Such a preliminary application covers and fills the pores which otherwise would tend to cause blow holes in a subsequent coating, and also provides a very receptive surface for a second coating application to furnish good bonding and retention of the final coating layer. I prefer to apply the light preliminary or mist coat to the surface of the product while it is at a temperature of approximately 125–250° F. If desired, the product may be at a higher temperature, although as a practical matter higher temperatures are not necessary and make the products more difficult to handle.

After the application of this light preliminary coat, it is desirable to wait a few minutes for the solvent in the coating material to evaporate and the product may then be given a second and heavier coating of the same or different composition, which also should contain a thermo-setting resin as its principal active ingredient. This second coat may be made heavy enough to be the final coat, or may be followed up by a subsequent application of another coat if such is desired or needed.

It simplifies operations to use the same coating composition for both stages, although this is not essential. For example, I have found that in producing a final coating of a melamine-aldehyde resin, the preliminary or mist coating can be carried out with the same composition, or with a coating composition using some other thermosetting resin, such as a phenolic or urea-formaldehyde resin.

After application of one or more finish coats, the coating operation may be completed by simply allowing the product to stand, if the product coated is at a sufficiently high temperature to start with and has not cooled too rapidly. Otherwise, it may be desirable to complete the curing operation by subjecting the coated product to a baking treatment at a suitable temperature and for sufficient time to insure that the resin is completely hardened or cured. This baking may be done by means of infra red lamps, baking furnaces, baking tunnels, or in any other suitable manner.

A particular feature of my invention is that this coating process can be carried out advantageously as an integral part of the manufacture of baked clay and similar products. While the process can be applied to products that are simply preheated before the coating operation, it is most desirable to utilize the residual heat of freshly fired clay products as a means of producing at least a partial curing of the resin.

For example, in the manufacture of brick, the raw brick are frequently placed on cars and moved through a continuous tunnel kiln emerging completely fired and usually at a temperature in the neighborhood of 400° F. Such brick may be arranged on the cars going through the kiln in the proper manner for coating the upper surface of them when they emerge, or they may be restacked on a car or conveyor after firing so that a number of brick can be coated on one face simultaneously while they are cooling. Such brick, properly arranged, can be passed under a spray which coats them while they are still at a fairly high temperature of the order of 200–250° F. with a thin or mist coating of the resinous composition. After 2 to 4 minutes, during which the pores in the brick are largely sealed and the solvent from the mist coating evaporates, a second and heavier coat can be applied immediately on the same face of the brick. A sufficient time should thereupon elapse to allow proper evaporation of solvent before exposure of the coated brick to any further heat. If necessary, the brick may thereafter be passed through a baking tunnel or under infra red lamps, or in any other suitable manner subjected to additional heating for the proper time to produce a final curing or hardening of the coating.

By way of example, I have found that the following composition is very well suited for coating brick in accordance with the foregoing procedure. It should be understood, however, that many variations in the ingredients and their proportions in this coating composition can be made with appropriate adjustments of times, temperatures and other factors in the coating procedure.

*Example*

| | |
|---|---|
| Titanium dioxide or other pigment | 5 lbs. |
| Alkyd resin solid as "Rezyl 387–5" (55% alkyd resin 45% xylol) | 14 lbs., 6 oz. |
| Melamine-aldehyde resin (50% resin solids, 25% butanol, 25% xylol) | 10 lbs., 10 oz. |
| Xylol | 4 lbs. |

This composition is suitable for coating most brick and has a viscosity of 60 seconds in a No. 4 Ford cup which is satisfactory for spraying. The foregoing composition may also be thinned with additional xylol to a 30 second viscosity.

A product coated by my preferred procedure has a very hard, glossy, smooth surface which can be formed in pastel or other attractive colors.

The coated surface is highly resistant to dilute acids, alkalies, grease, ink stains, steam, moderate temperature changes, and has a very high impact resistance compared with surfaces of ceramic glaze. It has also been found that brick and other masonry products having an exposed face coated by my procedure have adequate resistance to marring by working tools and are not injured by the usual compression loads applied to such products formed into a wall or other structure. The coating also provides an effective seal for the pores in the product which prevents penetration of moisture through the coating.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process of coating a surface of a somewhat porous molded masonry product to form a relatively thin layer bonded thereto and provided with a hard smooth outer surface which comprises in continuous succession spraying on the product surface while said surface is heated to a temperature of the order of 125 to 250° F. a light mist coating of a liquid composition including a solution of a heat hardenable thermo-setting resin in a volatile solvent, allowing for no more than a few minutes said resin to partially cure and the solvent in said composition to evaporate to form a thin partially cured film which seals at least most of the pores in the product surface, immediately thereafter and while the surface is still heated and said film is only partially cured applying onto said film a heavier coating of liquid thermo-setting resin composition compatible with said film, and subjecting the coated product to sufficient heat to produce a final hardening and bonding of the composite coating.

2. A process as defined in claim 1 in which both the liquid coating compositions contain melamine-aldehyde resins as their principal heat hardenable constituent.

3. A process as defined in claim 1 in which both the liquid coating compositions contain urea-formaldehyde resins as their principal heat hardenable constituent.

4. A process as defined in claim 1 in which the heat hardenable constituents in each of the coating compositions consist essentially of melamine-aldehyde and alkyd resins.

ALEXANDER H. RUSSELL.

References Cited in the file of this patent

UNITED STATES PATENTS

| Number | Name | Date |
| --- | --- | --- |
| 747,935 | Caffall | Dec. 29, 1903 |
| 1,502,501 | Gumowski | July 22, 1924 |
| 1,721,367 | Barringer | July 16, 1929 |
| 2,061,352 | Dillon | Nov. 17, 1936 |
| 2,363,658 | Decker | Nov. 28, 1944 |
| 2,392,551 | Roe | Jan. 8, 1946 |

FOREIGN PATENTS

| Number | Country | Date |
| --- | --- | --- |
| 549,009 | Great Britain | Nov. 3, 1942 |

OTHER REFERENCES

Palmer Paint Manufacture Co., 1949, pages 5–10.